(12) United States Patent
Gupta et al.

(10) Patent No.: US 10,318,546 B2
(45) Date of Patent: Jun. 11, 2019

(54) SYSTEM AND METHOD FOR TEST DATA MANAGEMENT

(71) Applicant: American Express Travel Related Services Company, Inc., New York, NY (US)

(72) Inventors: Ashish Gupta, Phoenix, AZ (US); Prasanta Kumar Mishra, Phoenix, AZ (US); Prakash Hariharan, Phoenix, AZ (US); Richard Maze, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 248 days.

(21) Appl. No.: 15/269,269

(22) Filed: Sep. 19, 2016

(65) Prior Publication Data

US 2018/0081955 A1    Mar. 22, 2018

(51) Int. Cl.
*G06F 16/27* (2019.01)
*G06Q 20/40* (2012.01)
*G06F 16/22* (2019.01)
*G06Q 20/38* (2012.01)

(52) U.S. Cl.
CPC ............ *G06F 16/27* (2019.01); *G06F 16/221* (2019.01); *G06Q 20/389* (2013.01); *G06Q 20/4016* (2013.01)

(58) Field of Classification Search
CPC ......... G06F 17/30315; G06F 17/30575; G06F 17/18; G06F 17/30592; G06F 11/3612; G06F 17/30; G06F 11/3688; G06F 11/2273; G06F 11/3684; G06F 11/273; G06F 16/27; G06F 16/283; G06F 16/221; G06Q 20/027; G06Q 20/40; G06Q 20/4016; G06Q 20/389; G06Q 40/00
See application file for complete search history.

(56) References Cited

U.S. PATENT DOCUMENTS

| | | | |
|---|---|---|---|
| 5,075,857 A * | 12/1991 | Maresca | G01V 1/16 52/167.1 |
| 7,610,233 B1 * | 10/2009 | Leong | G06Q 10/087 705/26.3 |
| 2003/0084429 A1 * | 5/2003 | Schaefer | G06F 11/3664 717/125 |
| 2003/0149709 A1 * | 8/2003 | Banks | G06F 16/273 707/E17.005 |
| 2005/0149582 A1 * | 7/2005 | Wissmann | G06F 16/275 707/E17.005 |
| 2006/0206534 A1 * | 9/2006 | Banks | G06F 16/2329 707/E17.007 |

(Continued)

*Primary Examiner* — Anh Ly
(74) *Attorney, Agent, or Firm* — Snell & Wilmer, L.L.P.

(57) ABSTRACT

The method for test data management may comprise receiving a test data characteristic; retrieving a master copy data from a master copy database; generating a secondary copy data, wherein the secondary copy data comprises a subset of the master copy data corresponding to the test data characteristic; generating a test copy data, wherein the test copy data is a copy of the secondary copy data; and transmitting the test copy data to a test environment. In this manner, the efficiency and resiliency of the system may be enhanced, and the test copy data may be improved so that the network may function according to approved parameters.

18 Claims, 5 Drawing Sheets

(56) References Cited

U.S. PATENT DOCUMENTS

| | | | | |
|---|---|---|---|---|
| 2006/0230083 A1* | 10/2006 | Allyn | ............... | G06F 11/3684 |
| | | | | 707/E17.005 |
| 2010/0332535 A1* | 12/2010 | Weizman | ............ | G06F 11/3672 |
| | | | | 707/770 |
| 2013/0166507 A1* | 6/2013 | Staczek | ................... | G06F 9/542 |
| | | | | 707/625 |
| 2014/0114742 A1* | 4/2014 | Lamontagne | ...... | G06Q 30/0242 |
| | | | | 705/14.41 |
| 2014/0350968 A1* | 11/2014 | Hahn | .................... | G06Q 20/40 |
| | | | | 705/3 |
| 2014/0379677 A1* | 12/2014 | Driesen | ................ | G06F 16/245 |
| | | | | 707/704 |
| 2015/0073952 A1* | 3/2015 | Ventura | ................. | G06Q 40/12 |
| | | | | 705/30 |
| 2015/0113330 A1* | 4/2015 | Grondin | ............. | G06F 11/3684 |
| | | | | 714/38.1 |
| 2015/0143064 A1* | 5/2015 | Bhargava | ........... | G06F 11/1451 |
| | | | | 711/162 |
| 2015/0286697 A1* | 10/2015 | Byrne | ............... | G06F 17/30663 |
| | | | | 707/600 |
| 2017/0011447 A1* | 1/2017 | Kemmer | ........... | G06Q 30/0635 |
| | | | | 707/E17.014 |
| 2017/0178087 A1* | 6/2017 | Barnett | ................ | G06Q 40/00 |
| | | | | 707/E17.005 |
| 2017/0270149 A1* | 9/2017 | Grosman | ........... | G06F 16/2358 |
| | | | | 707/E17.007 |

\* cited by examiner

SYSTEM AND METHOD FOR TEST DATA MANAGEMENT

FIELD

The disclosure generally relates to data management and analytics, and more specifically, to systems and methods for test data management.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. An example of the use of large data is in assembling test data sets to perform analysis of transaction data, which is frequently a key priority for transaction account issuers. In that regard, transactions processed by the transaction account issuer are massive in volume and comprise tremendously large data sets.

Large data sets may have challenges. For example, a user may wish to retrieve a test data set for analysis of transaction data. The test data set may comprise a subset of the larger data set, and the user may wish to limit the test data set to a subset of fields and/or attributes otherwise available in a large data set. The process of sorting and filtering the large data set to conform to the desired limitations may be time consuming and may also use a large amount of computing resources, particularly if the data is desired to be updated at some interval. Moreover, different test environments may require different database structures and requirements and may comprise different desired limitations. These limitations often hamper the availability of test data sets, result in the use of stale test data, and confuse the analysis of the transaction data.

SUMMARY

In various embodiments, systems, methods, and articles of manufacture (collectively, the "system") for test data management are disclosed. The system may receive a test data characteristic and retrieve a master copy data from a master copy database. The system may generate secondary copy data. The secondary copy data may comprise a subset of the master copy data corresponding to the test data characteristic. The system may generate test copy data. The test copy data may be a copy of the secondary copy data. The system may transmit the test copy data to a test environment.

In various embodiments, the master copy data may be generated by various operations. The system may receive a master copy data attribute from a metadata library. The system may retrieve production data from a production data system. The system may generate the master copy data, wherein the master copy data comprises a subset of the production data corresponding to the master copy data attribute. The system may transmit the master copy data to the master copy database. In various embodiments, the system may further update the master copy data at a first master copy polling interval. In various embodiments, the system may also update the master copy data with a synthetic data in response to the production data system not comprising the production data corresponding to the master copy data attribute.

In various embodiments, the system may retrieve the secondary copy data in response to the test copy data being deleted. The system may generate a second test copy data, wherein the second test copy data is a copy of the secondary copy data. The system may transmit the secondary copy data the test environment.

In various embodiments, the system may transmit the secondary copy data to a secondary copy database. In various embodiments, the system may retrieve the test copy data from the test environment. The system may generate an iterative secondary copy data, wherein the iterative secondary copy data is a copy of the test copy data. The system may transmit the iterative secondary copy data to the secondary copy database. The secondary copy database may store the iterative secondary copy data as a version of the secondary copy data.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
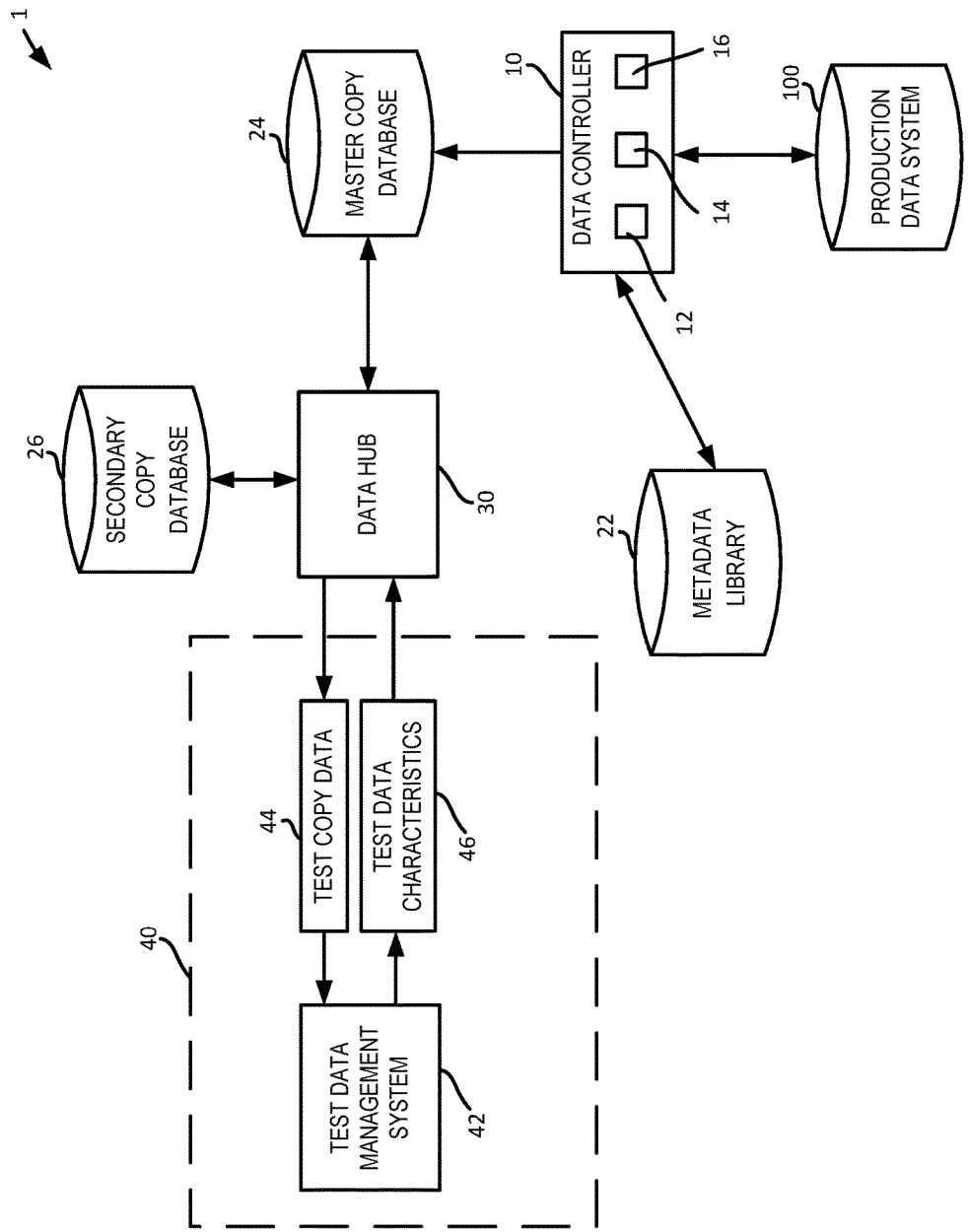
FIG. 1 is a block diagram illustrating various system components of a system for test data management, in accordance with various embodiments.
Figure 2:
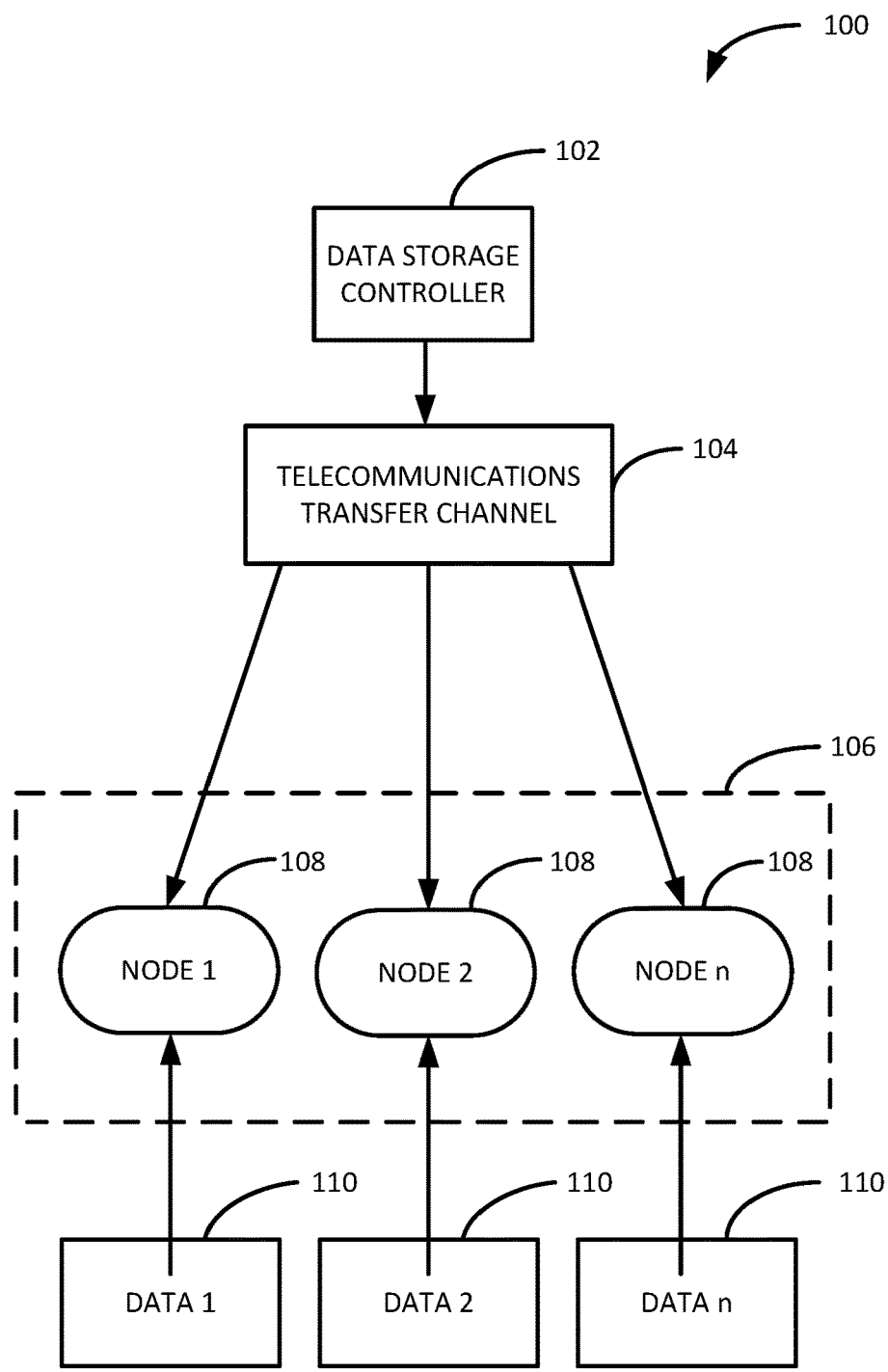
FIG. 2 is a block diagram illustrating various system components of a production data system, in accordance with various embodiments.

In various embodiments, and with reference to FIG. 1, a system 1 for test data management is provided. System 1 may comprise various logical modules configured to perform various operations and processes, in accordance with systems and methods disclosed herein. In various embodiments, system 1 may comprise a production data system 100. Production data system 100 may comprise a transaction account data processing system configured to authorize transaction account transactions. With reference to FIG. 2, production data system 100 may comprise various components, in accordance with various embodiments. Production data system 100 may comprise a data storage controller 102. Data storage controller 102 may comprise any device capable of receiving and/or processing an electronic message via telecommunications transfer channel 104. Telecommunications transfer channel 104 may comprise a network. Data storage controller 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data (e.g., transaction data) over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

A network may not be secure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

In various embodiments, data storage controller 102 may interact with distributed storage system 106 for storage and/or processing of large data sets. As used herein, large data may refer to partially or fully structured, semi-structured, or unstructured data sets including millions of rows and hundreds of thousands of columns. A large data set may be compiled, for example, from a history of purchase transactions over time, from web registrations, from social media, from records of charge (ROC), from summaries of charges (SOC), from internal data, or from other suitable sources. Large data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to data storage controller 102. Nodes 108 may be distributed geographically in different locations, housed in the same building, and/or housed in the same rack. Nodes 108 may also be configured to function in concert to provide storage space and/or processing power greater than one of a node 108 may provide alone. As a result, distributed storage system 106 may collect and/or store data 110. Data 110 may be collected by nodes 108 individually and compiled, or data 110 may be collected by nodes 108 in concert and collated. Data 110 may further be compiled into a data set and formatted for use by data storage controller 102.

In various embodiments, data 110 may comprise a collection of data including and/or originating from account holder information, transaction information, account information, record of sales, account history, customer history, sensor data, machine log data, data storage system, public web data, and/or social media. Data 110 may be collected from multiple sources and amalgamated into a large data structure such as a file, for example. In that regard, the data may be used as an input to generate a master copy data attribute describing the large data structure itself, as well as the data stored in the structure (as discussed further below).

In various embodiments, the data 110 may comprise prospect data (e.g., data related to prospective account holders such as demographics, income, trade lines, trade line history, family status, social media posting, employment, and/or the like). The data 110 may comprise clickstream data (e.g., internet browsing history). The data 110 may comprise SCORE platform data (e.g., card provider internal data). The data 110 may comprise email data (e.g., interactions with the account holder, text mining of email contents, and/or the like). The data 110 may comprise internal data, such as data from an authorization system, for instance, data indicative of account holder spending patterns, account holder security questions and/or the like. The internal data may comprise bank remittance data (e.g., data provided by banks regarding transaction data of the account holder, present and historical account balances, transactions, transaction timing, bill payment, and/or the like). The internal data may comprise account holder data (e.g., name, age, address, billing and payment habits, transaction patterns, income, trade lines, trade line history, family status, social media posting, employment, demographics and/or the like). The internal data may also comprise account monitoring data (e.g. credit bureau inquiries). Moreover, the internal data may comprise accounting monitoring data (e.g., credit bureau inquiries), merchant payments/servicing, risk/fraud data, corporate consumers data, digital marketing and offers-related data, and corporate data (e.g., HR data, payroll data, and/or real estate data).

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

The distributed storage system 106 may comprise a transaction network. A data storage controller 102 may comprise various modules and engines (as discussed herein), wherein the transaction data is made available to aspects of system 1 according to FIG. 1 (e.g., according to the logical connection(s) illustrated in FIG. 1). This data may be provided for the establishing of test data sets, whereby transaction data may be assessed according to defined parameters. This may further improve the functioning of the transaction network. For instance, this may enable the determination of the proper usage of differentiated transaction instruments, according to their proper purposes. For instance, data related to a transaction may be identified as being associated with a transaction, whereby the transaction network may tailor the handling of the transaction (e.g., by denying it). The transaction network may actively deter misuse of transaction products not intended such transactions. The transaction network may also allow transaction products intended for such transactions. Moreover, in response to an allowed transaction, the transaction network may deliver value-added services, such as electronically provided advertisements, offers, and/or other credit or lending products. In this manner, the transaction network more properly functions according to approved parameters.

Moreover, such identifications enhance credit risk discrimination, identification of businesses and consumers associated with a business organization who may presently be consumer account holders, whereby business-oriented transactions cards may be provided to them. Such identifications enable the promotion of relevant merchants to relevant account holders, such as to promote business-to-business relationship building and/or potential business-to-business relationships.

In various embodiments, the establishment of test data sets involves multiple complex and interactive machine steps. For instance, by evaluating the data 110 at a transaction level, assessing the nature of a transaction at the individual transaction level provides sufficient granularity. Data may be evaluated at the transaction level and/or aggregated such as to determine if an account holder (e.g., supplementary card holder, a third-party merchant with whom account holders or supplementary card holders engage in transactions or any other transaction party) may be identified. Moreover, such identification may be combined with or enhance the identification of such aspects as account or card type, merchant industry codes, transaction amounts, number of transactions by an individual or a business in an industry (or at a particular merchant in an industry), determination of gross sales, removal of noise inducing transactions, and/or controlling for transactions having similar profiles (e.g., to facilitate further data processing).

Thus, it may be appreciated that in view of the preceding discussion, this disclosure may facilitate the identification of credit risk, likelihood of fraud, identification and classification of transactions (and counterparties to the transactions) to facilitate marketing, and tailoring of online ad experiences.

In various embodiments, and with reference again to FIG. 1, production data system 100 may be in communication with a master copy database 24 via a data controller 10. Data controller 10 may perform operations on data from production data system 100, and then store the data into master copy database 24. Data controller 10 may comprise a processor, and/or any other suitable device. For example, data 110 (with brief reference to FIG. 2) may be received from production data system 100 and scrubbed. Scrubbing may include the removal of confidential information, such as a transaction account number and/or the like. In that regard, data controller 10 may comprise a scrubbing module 12 configured to scrub data. Such data 110 may also be anonymized. For instance, anonymizing may comprise replacing confidential information in data 110 with dummy information. For example, a portion of the digits of a transaction account number may be replaced with zeroes, asterisks, and/or the like. In that regard, data controller 10 may comprise an anonymizing module 14 configure to anonymize data. In various embodiments, data controller 10 may retrieve data 110 from production data system 100, scrub the data via scrubbing module 12, anonymize the data via anonymizing module 14, and store the data in master copy database 24.

In various embodiments, data controller 10 may also be configured to selectively retrieve data 110 from production data system 100. In that regard, and in various embodiments, system 1 may also comprise a metadata library 22. Metadata library 22 may be in communication with data controller 10. Metadata library 22 may be configured to store a master copy data attribute. The master copy data attribute may be manually entered by a user, automated based on analysis of processes, systems, and data 110 in production data system 100, and/or through any other suitable method. In that regard, the master copy data attribute may comprise attributes, metadata, and/or the like related to data 110. Data controller 10 may be configured to selectively retrieve data 110 from production data system 100 based on the master copy data attribute. For example, a user, system, and/or the like may select the master copy data attribute from metadata library 22 to allow data controller 10 to select only a subset of data 110 from production data system 100. In that regard, data controller 10 may retrieve only the subset of data 110 comprising the same metadata and/or attributes of the selected master copy data attribute. For example, a master data copy attribute may comprise "product type", or more specifically, "corporate", "meeting", "corporate extra", and/or the like. A master data copy attribute may comprise "market", or more specifically, "United States", "Canada", "United Kingdom", and/or the like. A master data copy attribute may comprise "account status", or more specifically, "active", "cancelled", "suspended", and/or the like. A master data copy attribute may comprise "billing type", or more specifically, "individual", "combined", "company", and/or the like. A master data copy attribute may comprise "card_type", or more specifically, "basic", "supplemental", and/or the like; and/or any other suitable type of attribute. Data controller 10 may be configured to transmit the received data 110 to master copy database 24 for storage as the master copy data.

In various embodiments, data controller 10 may also comprise an update module 16. Update module 16 may poll production data system 100 at a first master copy polling interval, and may then update master copy database 24. In that regard, data controller 10, via update module 16, may scan production data system 100 to determine changes in data 110. In response to determining a change in data 110, data controller 10, via update module 16, may update the corresponding master copy data in master copy database 24. The first master copy polling interval may comprise any suitable time interval, such as daily, monthly, every six months, yearly, and/or any other desired time interval. The first master copy polling interval may also comprise automated computer events, such as in response to changes in data 110, production data system 100, and/or any other suitable or desired computer event. For example, an automated computer event may comprise a billing cycle date, such that the master copy data may be updated every billing cycle for individual data 110. In this manner, master copy database 24 may remain "fresh," and the interactions with test environment 40 (discussed further herein) may be isolated from production data system 100, such as to prevent overloading production data system 100 resources and to facilitate the efficient functioning of production data system 100, while also permitting test environment 40 access to a most recent copy (relative to the first master copy polling interval) of data 110 of production data system 100.

Furthermore, and as mentioned above, master copy database 24 may be configured to store master copy data. The master copy data may be stored in any suitable format, including as raw, unformatted data. Master copy database 24 may be in communication with data controller 10 to receive the master copy data. Master copy database 24 may also be in communication with data hub 30 to allow for retrieval of the master copy data when queried by test environment 40 for data analysis.

In various embodiments, system 1 may comprise a test environment 40. Test environment 40 may comprise features and aspects, whereby users may access data for various purposes, such as for system testing and data analysis. In various embodiments, test environment 40 may comprise a test data management system 42. Test data management system 42 may be configured to develop test data characteristics 46 (also called "user requirements" or "TDCs"). In that regard, test data management system 42 may provide a user terminal, and/or the like, allowing a user to enter test data characteristics 46 into test data management system 42. Test data characteristics 46 may also be created via an automated and/or manually triggered process in test environment 40. For example, test data characteristics 46 may be created automatically through various product development tools. In that regard, business driven development models in the product development tools may receive and/or generate test scenarios for test environment 40. The test scenarios may comprise various testing situations and requirements based on a user input and/or system needs. Test data management system 42 may analyze and/or parse the test scenario, and generate test data characteristics 46 based on the test scenario. Test data characteristics 46 may comprise a specific field or fields of the data 110 (with brief reference to FIG. 2) that is desired to be accessed, and/or limitations on the range of values in those fields desired to be accessed. For instance, test data characteristics 46 may comprise a field such as account holder age, or transaction value. Test data characteristic 46 may also be limited to a range of values such as ages 30-40 or a range of transaction values, such as transactions less than $15. Test data characteristics 46 may comprise any variety of aspects of the data 110 for which test data management system 42 desires to cull data. Test data management system 42 may transmit test data characteristics 46 to data hub 30.

In various embodiments, data hub 30 may provide a logical boundary at the periphery of test environment 40 and may be interstitial between master copy database 24 and other aspects of test environment 40. Data hub 30 may be configured to be a central hub between master copy database 24 and other aspects of test environment 40, allowing test environment 40 to remain isolated from various aspects of a production environment (e.g., production data system 100), while still allowing test environment 40 to retrieve data from the production environment (e.g., via secondary copy database 26). For instance, data hub 30 may comprise an interstitial resource configured to allow formulation and submission of test data characteristics 46, via test data management system 42, and receipt of test copy data 44. Data hub 30 may comprise a processor, computer based system, and/or any other suitable system or device.

In various embodiments, data hub 30 may be configured to receive test data characteristics 46, via test data management system 42. Data hub 30 may query master copy database 24 to retrieve the master copy data associated with test data characteristics 46. Data hub 30 may generate secondary copy data comprising the master copy data associated with test data characteristics 46, and may store the secondary copy data in a secondary copy database 26. In various embodiments, data hub 30 may also be configured to generate test copy data 44. In that regard, test copy data 44 may comprise data identical to or similar to the secondary copy data (e.g., test copy data 44 may comprise the master copy data associated with test data characteristics 46). Data hub 30 may be configured to generate test copy data 44 and transmit test copy data 44 to test environment 40, such as to test data management system 42. In various embodiments, data hub 30 may also be configured to generate test copy data 44 having a format for a particular database structure (e.g., Oracle®, and/or the like). In that respect, data hub 30 may comprise data transformation tools comprising formatting guidelines and instructions for various database structures. Data hub 30 may receive a database format requirement from test environment 40, and may generate test copy data 44 that comprises that database format requirement. Data hub 30 may also be operative to communicate with test environment 40 to determine the appropriate database format requirement, and may generate test copy data 44 accordingly.

Figure 3:
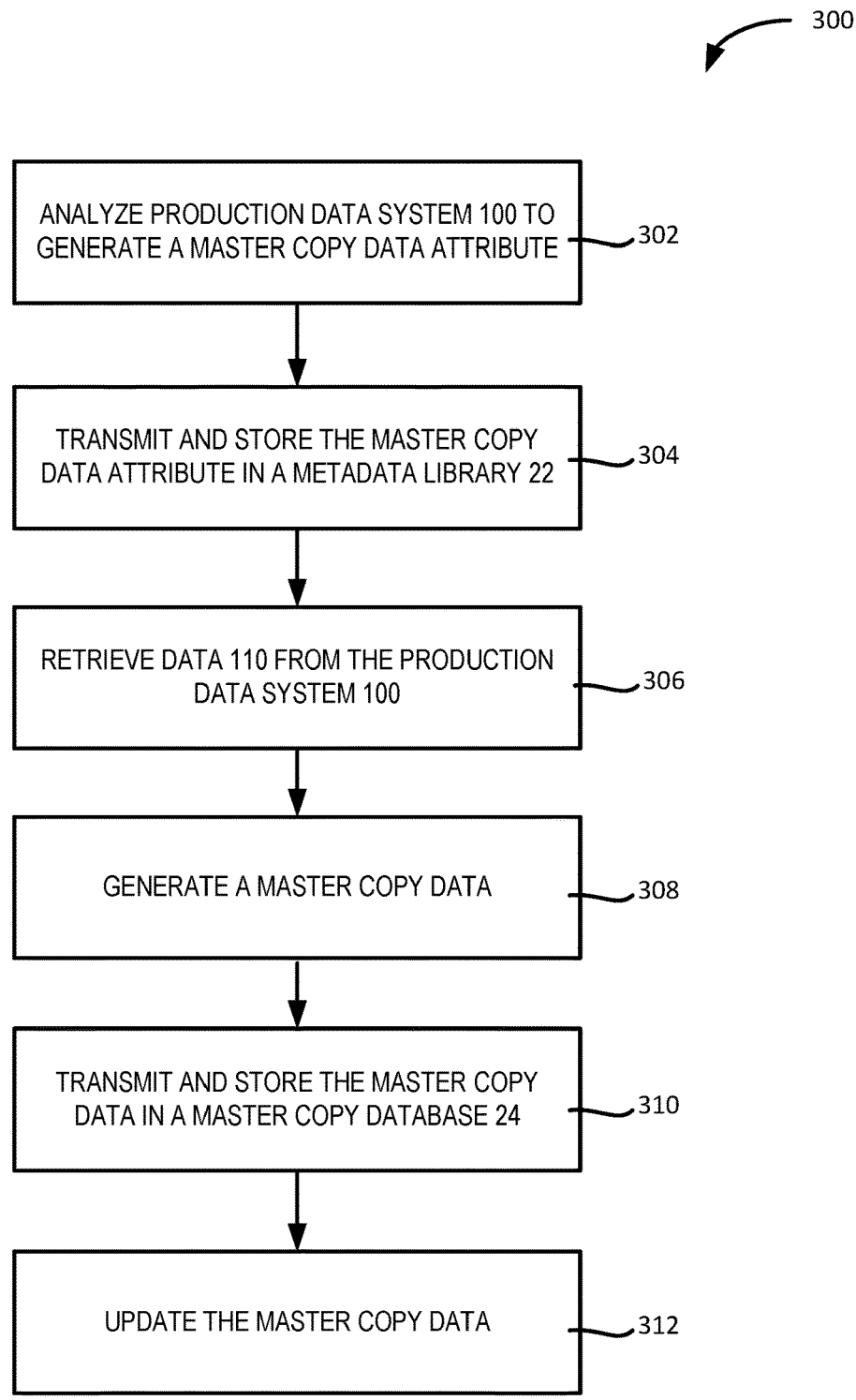
FIG. 3 illustrates a process flow for generating a master copy data, in accordance with various embodiments.

Having discussed various aspects of system 1 for test data management, reference is directed to FIG. 3, in addition to FIGS. 1 and 2. A method 300 of generating a master copy data is disclosed. In various embodiments, method 300 may comprise analyzing production data system 100 to generate a master copy data attribute (Step 302). In that regard, data controller 10 may communicate with production data system 100 to analyze attributes, metadata, and/or the like, of data 110. Data controller 10 may then parse the analysis to generate the master copy data attribute. In various embodiments, method 300 may comprise transmitting and storing the master copy data attribute in a metadata library 22 (Step 304). Data controller 10 may transmit the master copy data attribute to metadata library 22 for storage.

In various embodiments, method 300 may comprise retrieving data 110 from the production data system 100 (Step 306). Data controller 10 may retrieve data 110 from production data system 100. Data controller 10 may selectively retrieve data 110 based on the master copy data attributes. In that regard, data controller 10 may retrieve the master copy data attributes from metadata library 22, and query production data system 100 to retrieve data 110 corresponding to the master copy data attributes. For instance, data controller 10 may retrieve only the subset of data 110 comprising the same metadata and/or attributes of the selected master copy data attribute. In various embodiments, method 300 may comprise generating a master copy data (Step 308). Data controller 10 may generate the master copy data by scrubbing, via scrubbing module 12, and anonymizing, via anonymizing module 14, the data retrieved in Step 306. In various embodiments, method 300 may comprise transmitting and storing the master copy data in a master copy database 24 (Step 310). Data controller 10 may transmit the master copy data to master copy database 24 for storage. In various embodiments, master copy database 24 may store the master copy data using any suitable and/or desired format, including, for example, as raw, unformatted data.

In various embodiments, method 300 may comprise updating the master copy data (Step 312). In that regard, data controller 10, via update module 16, may retrieve data from production data system 100, corresponding to the master copy data attributes, at a first master copy polling interval. In that regard, data controller 10, via update module 16, may scan production data system 100 to determine changes in data 110. In response to determining a change in data 110, data controller 10, via update module 16, may update the corresponding master copy data in master copy database 24. In various embodiments, data controller 10 may also update the master copy data with a synthetic data. In that regard, the synthetic data may comprise generated data that is not yet in production data system 100. The synthetic data may be generated via manual input by a user, computer automation, and/or through any other suitable method. The synthetic data may be introduced in response to data not existing in production data system 100 for a master copy data attribute. For example, in response to a new travel card being introduced in a new geographical market, production data system 100 may not yet comprise any data 110 until the new travel card is issued to customers. It may be desired to test aspects of the data in test environment 40, however, so the synthetic data may be generated such that the master copy data comprises data bearing similar attributes, fields, and values to what the "real" data may comprise.

Figure 4:
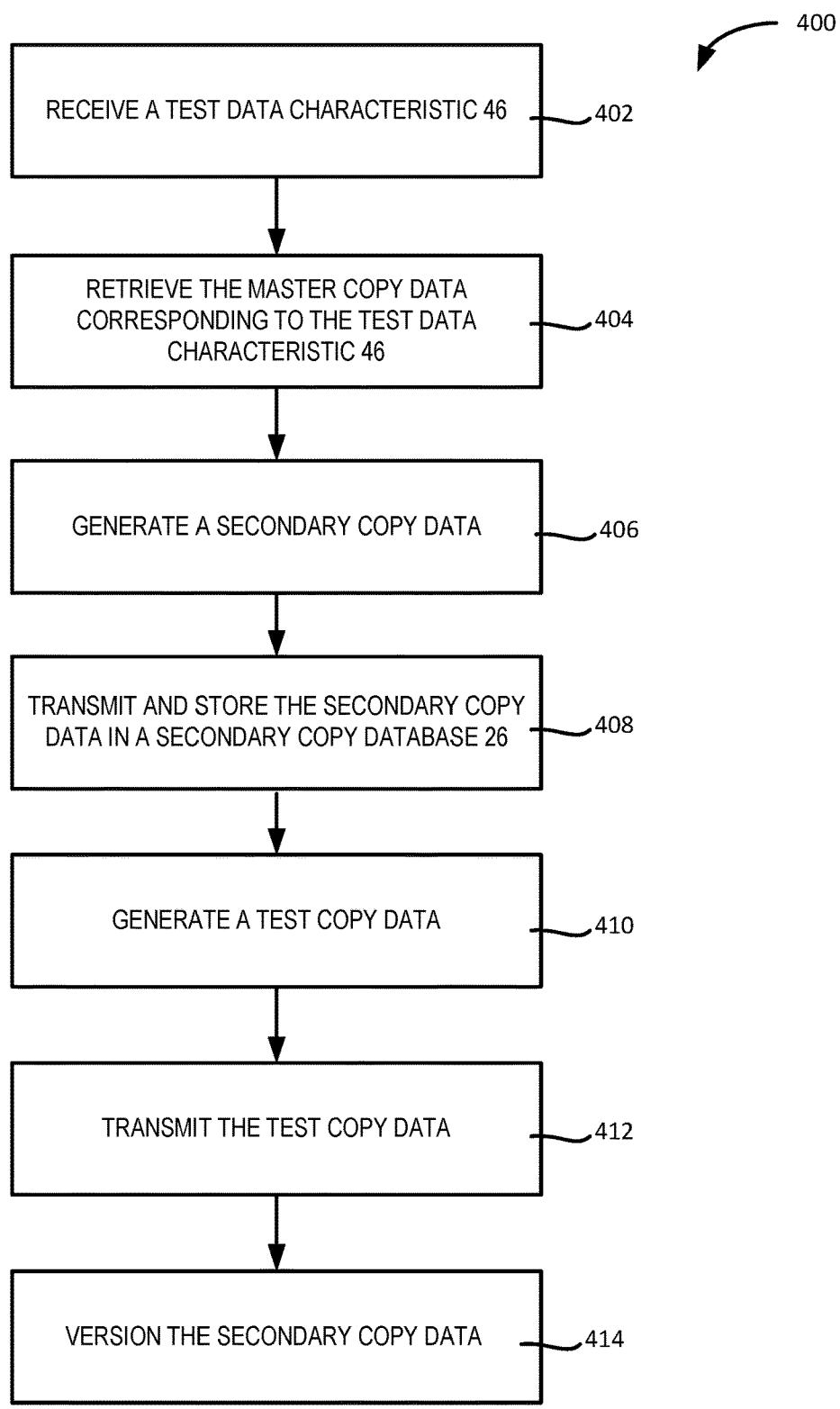
FIG. 4 illustrates a process flow for test data management, in accordance with various embodiments.

In various embodiments, and with reference to FIG. 4, in addition to FIGS. 1 and 2, a method 400 of test data management is disclosed. In various embodiments, method 400 may comprise receiving a test data characteristic 46 (Step 402). The test data characteristic 46 may be transmitted via test data management system 42 to data hub 30. In various embodiments, method 400 may comprise retrieving data from the master copy data corresponding to the test data characteristic 46 (Step 404). Data hub 30 may query master copy database 24 to retrieve all data in the master copy data corresponding to the test data characteristic 46.

In various embodiments, method 400 may comprise generating a secondary copy data (Step 406). In that regard, data hub 30 may generate the secondary copy data to comprise the data retrieved from the master copy data in Step 404. In various embodiments, method 400 may comprise transmitting and storing the secondary copy data in a secondary copy database 26 (Step 408). Data hub 30 may transmit the secondary copy data to the secondary copy database 26 for storage. In various embodiments, method 400 may comprise generating a test copy data 44 (Step 410). Data hub 30 may generate test copy data 44. Test copy data 44 may be a replicate (copy) of the secondary copy data. In various embodiments, data hub 30 may format test copy data 44 as required and/or desired for test environment 40, such as, for example, to be compliant with a specific database structure. In that respect, data hub 30 may comprise data transformation tools comprising formatting guidelines and instructions for various database structures. Data hub 30 may receive a database format requirement from test environment 40, and may generate test copy data 44 that comprises that databaseformat requirement. Data hub 30 may also operative communicate with test environment 40 to determine the appropriate database format requirement, and may generate test copy data 44 accordingly. In various embodiments, method 400 may comprise transmitting the test copy data 44 (Step 412). Data hub 30 may transmit the test copy data 44 to test data management system 42.

In various embodiments, method 400 may comprise versioning the secondary copy data (Step 414). In that regard, data hub 30 may be configured to poll test environment 40 at a first secondary copy polling interval to retrieve test copy data 44, and transmit the test copy data 44 to secondary copy database 26 for storage. Data hub 30 may generate an iterative secondary copy data, comprising a replicate of the test data copy. Secondary copy database 26 may store the iterative secondary copy data as an iteration of the secondary copy data. In that regard, storing the iterative secondary copy data may allow for iterative backups of the test data copy, in the event that the test data copy is changed in test environment 40. In various embodiments, and in response to test copy data 44 being formatted during Step 410, data hub 30 may remove all formatting to test copy data 44 prior to generating the iterative secondary copy data.

Figure 5:
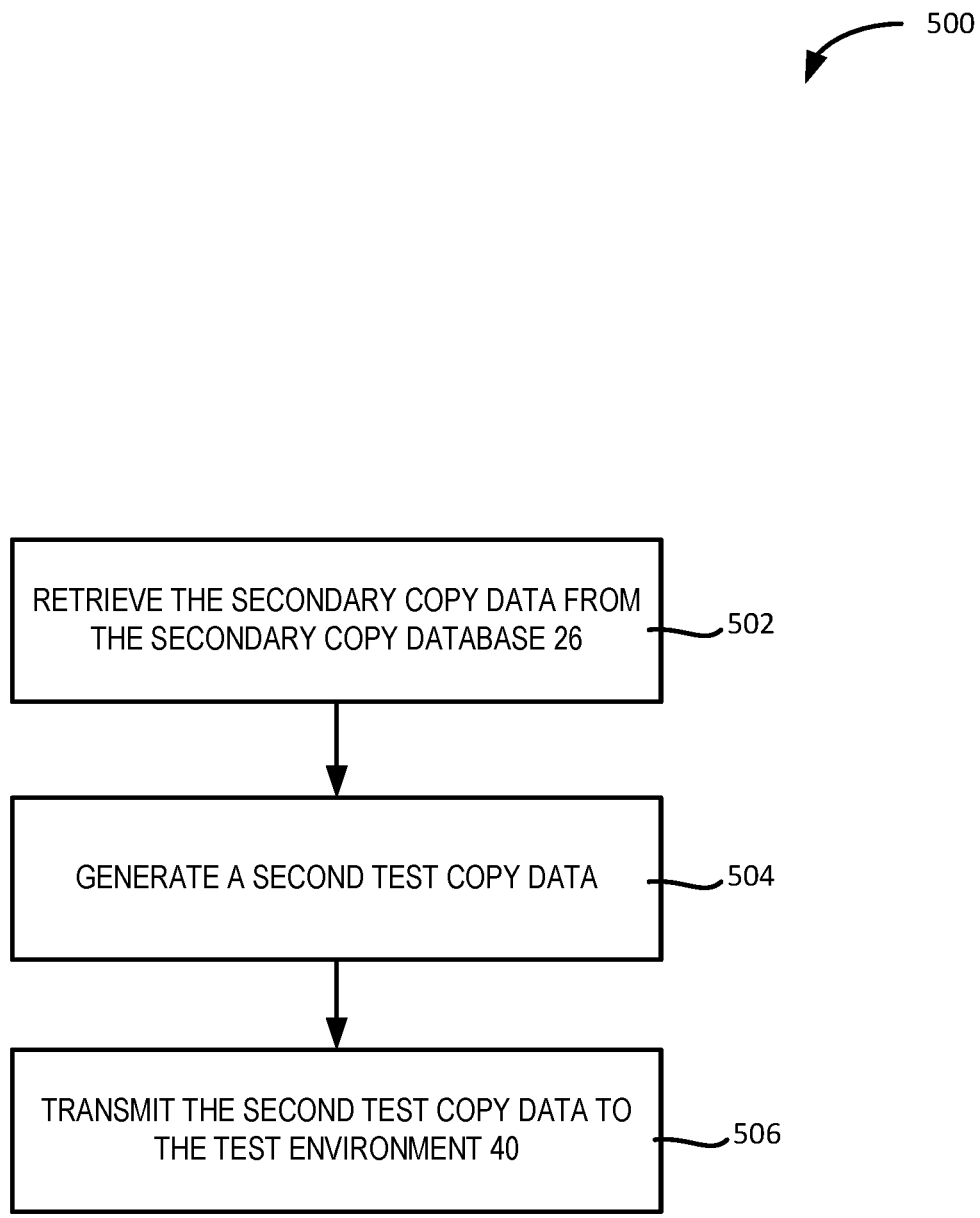
FIG. 5 illustrates a process flow for restoring test copy data, in accordance with various embodiments.

In various embodiments, and with reference to FIG. 5, in addition to FIGS. 1 and 2, a method 500 of restoring test copy data is disclosed. Method 500 may enable the restoration of test copy data in the event of deletion, corruption, and/or the like. In that regard, method 500 may allow for restoration of an exact copy of the test copy data (e.g., the secondary copy data), without needing to retrieve data from a production environment (e.g., production data system 100). In various embodiments, method 500 may comprise retrieving the secondary copy data from the secondary copy database 26 (Step 502). Test data management system 42 may communicate with data hub 30 to retrieve the secondary copy data, in response to the test data copy being deleting, corrupted, and/or the like. Data hub 30 may retrieve the secondary copy data from secondary copy database 26. In various embodiments, method 500 may comprise generating a second test copy data (Step 504). Data hub 30 may generate the second test copy data as a copy of the secondary copy data. In various embodiments, method 500 may comprise transmitting the second test copy data to the test environment 40 (Step 506). Data hub 30 may transmit the second test copy data to test environment 40, such as to test data management system 42. In that respect, the second test copy data may function as a restore of the test copy data in test environment 40.

In various embodiments, the system and method may include alerting a subscriber when their computer is offline. With brief reference to FIG. 1, system 1 (e.g., test data management system 42) may include generating customized information and alerting a remote subscriber that the information can be accessed from their computer. The alerts are generated by filtering received information, building information alerts and formatting the alerts into data blocks based upon subscriber preference information, via test data management system 42, for example. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source (e.g., data 110 in production data system 100) over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (e.g., via a user terminal in communication with test data management system 42); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., test data management system 42) from being compromised, for example by being infected with a computer virus. The system may scan, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page, e.g., through the testing of data in test environment 40. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 1 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

As used herein, the term "end user", "consumer", "customer", "cardmember", "business", "merchant", or "financial institution" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other transaction networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a processor of a computer based system, a test data characteristic;
retrieving, by the processor, master copy data from a master copy database, wherein the master copy data provides an isolated copy of production data from a production data system to reduce use of computing resources in the production data system;
generating, by the processor, secondary copy data, wherein the secondary copy data comprises a subset of data from the master copy data, and wherein the subset of data is determined based on the test data characteristic;
generating, by the processor, test copy data, wherein the test copy data comprises a copy of data from the secondary copy data;
transmitting, by the processor, the test copy data to a test environment;
generating, by the processor, iterative secondary copy data, wherein the iterative secondary copy data is a copy of the test copy data; and
transmitting, by the processor, the iterative secondary copy data to a secondary copy database, wherein the secondary copy database stores the iterative secondary copy data as a version of the secondary copy data, and wherein the iterative secondary copy data provides an iterative backup of the test data copy for use in response to the test copy data being deleted or changed in the test environment.

2. The method of claim 1, further comprising:
receiving, by the processor, a master copy data attribute from a metadata library;
retrieving, by the processor, the production data from the production data system;
generating, by the processor, the master copy data, wherein the master copy data comprises a subset of data from the production data, wherein subset of data is determined based on the master copy data attribute; and
transmitting, by the processor, the master copy data to the master copy database.

3. The method of claim 2, further comprising updating, by the processor, the master copy data at a first master copy polling interval.

4. The method of claim 2, further comprising updating, by the processor, the master copy data with a synthetic data in response to the production data system not comprising the production data corresponding to the master copy data attribute.

5. The method of claim 1, further comprising:
retrieving, by the processor, the secondary copy data in response to the test copy data being deleted;
generating, by the processor, second test copy data, wherein the second test copy data is a copy of the secondary copy data; and
transmitting, by the processor, the second test copy data to the test environment.

6. The method of claim 1, further comprising transmitting, by the processor, the secondary copy data to the secondary copy database.

7. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a test data characteristic;
retrieving, by the processor, master copy data from a master copy database, wherein the master copy data provides an isolated copy of production data from a production data system to reduce use of computing resources in the production data system;
generating, by the processor, secondary copy data, wherein the secondary copy data comprises a subset of data from the master copy data, and wherein the subset of data is determined based on the test data characteristic;
generating, by the processor, test copy data, test copy data, wherein the test copy data comprises a copy of data from the secondary copy data; and
transmitting, by the processor, the test copy data to a test environment;
generating, by the processor, iterative secondary copy data, wherein the iterative secondary copy data is a copy of the test copy data; and
transmitting, by the processor, the iterative secondary copy data to a secondary copy database, wherein the secondary copy database stores the iterative secondary copy data as a version of the secondary copy data, and wherein the iterative secondary copy data provides an iterative backup of the test data copy for use in response to the test copy data being deleted or changed in the test environment.

8. The system of claim 7, wherein the master copy data is generated by operations comprising:
receiving, by the processor, a master copy data attribute from a metadata library;
retrieving, by the processor, the production data from the production data system;
generating, by the processor, the master copy data, wherein the master copy data comprises a subset of data from the production data, wherein subset of data is determined based on the master copy data attribute; and
transmitting, by the processor, the master copy data to the master copy database.

9. The system of claim 8, further comprising updating, by the processor, the master copy data at a first master copy polling interval.

10. The system of claim 8, further comprising updating, by the processor, the master copy data with a synthetic data in response to the production data system not comprising the production data corresponding to the master copy data attribute.

11. The system of claim 7, further comprising:
retrieving, by the processor, the secondary copy data in response to the test copy data being deleted;
generating, by the processor, second test copy data, wherein the second test copy data is a copy of the secondary copy data; and
transmitting, by the processor, the second test copy data to the test environment.

12. The system of claim 7, further comprising transmitting, by the processor, the secondary copy data to the secondary copy database.

13. An article of manufacture including a non-transitory, tangible computer readable storage medium having instructions stored thereon that, in response to execution by a computer based system, cause the computer based system to perform operations comprising:

receiving, by the computer based system, a test data characteristic;

retrieving, by the computer based system, master copy data from a master copy database, wherein the master copy data provides an isolated copy of production data from a production data system to reduce use of computing resources in the production data system;

generating, by the computer based system, secondary copy data, wherein the secondary copy data comprises a subset of data from the master copy data, and wherein the subset of data is determined based on the test data characteristic;

generating, by the computer based system, test copy data, wherein the test copy data comprises a copy of data from the secondary copy data; and transmitting, by the computer based system, the test copy data to a test environment;

generating, by the computer based system, iterative secondary copy data, wherein the iterative secondary copy data is a copy of the test copy data; and transmitting, by the computer based system, the iterative secondary copy data to a secondary copy database, wherein the secondary copy database stores the iterative secondary copy data as a version of the secondary copy data, and wherein the iterative secondary copy data provides an iterative backup of the test data copy for use in response to the test copy data being deleted or changed in the test environment.

14. The article of manufacture of claim 13, wherein the master copy data is generated by operations comprising:

receiving, by the computer based system, a master copy data attribute from a metadata library;

retrieving, by the computer based system, the production data from the production data system;

generating, by the computer based system, the master copy data, wherein the master copy data comprises a subset of data from the production data, and wherein subset of data is determined based on the master copy data attribute; and transmitting, by the computer based system, the master copy data to the master copy database.

15. The article of manufacture of claim 14, further comprising updating, by the computer based system, the master copy data at a first master copy polling interval.

16. The article of manufacture of claim 14, further comprising updating, by the computer based system, the master copy data with a synthetic data in response to the production data system not comprising the production data corresponding to the master copy data attribute.

17. The article of manufacture of claim 13, further comprising:

retrieving, by the computer based system, the secondary copy data in response to the test copy data being deleted;

generating, by the computer based system, second test copy data, wherein the second test copy data is a copy of the secondary copy data; and transmitting, by the computer based system, the second test copy data to the test environment.

18. The article of manufacture of claim 13, further comprising:

transmitting, by the computer based system, the secondary copy data to the secondary copy database.

* * * * *